(12) United States Patent
Anim-Appiah et al.

(10) Patent No.: US 7,471,745 B2
(45) Date of Patent: Dec. 30, 2008

(54) METHOD AND APPARATUS FOR CHANNEL QUALITY METRIC GENERATION WITHIN A PACKET-BASED MULTICARRIER MODULATION COMMUNICATION SYSTEM

(75) Inventors: Kofi D. Anim-Appiah, Allen, TX (US); Richard G. C. Williams, San Diego, CA (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 789 days.

(21) Appl. No.: 10/395,575

(22) Filed: Mar. 24, 2003

(65) Prior Publication Data

US 2004/0190648 A1    Sep. 30, 2004

Related U.S. Application Data

(60) Provisional application No. 60/429,771, filed on Nov. 27, 2002, provisional application No. 60/429,691, filed on Nov. 26, 2002.

(51) Int. Cl.
*H04L 27/00* (2006.01)

(52) U.S. Cl. .................. 375/324; 375/316; 375/322; 375/300; 370/281; 370/295; 370/319; 370/343; 370/344; 370/478; 370/480

(58) Field of Classification Search ............ 375/324, 375/340, 341, 347, 316, 322, 300; 370/281, 370/295, 319, 343, 344, 478, 480
See application file for complete search history.

(56) References Cited

U.S. PATENT DOCUMENTS

| 6,658,045 | B1* | 12/2003 | Jin ........................... 375/147 |
| 6,738,605 | B1* | 5/2004 | Gilberton et al. ......... 455/127.1 |
| 6,792,034 | B1* | 9/2004 | Lee et al. .................. 375/148 |
| 7,082,159 | B2* | 7/2006 | Larsson ..................... 375/224 |
| 2003/0031278 | A1* | 2/2003 | Kang et al. ................ 375/341 |
| 2003/0123383 | A1* | 7/2003 | Korobkov et al. .......... 370/208 |
| 2003/0179727 | A1* | 9/2003 | Soong et al. ............... 370/328 |

FOREIGN PATENT DOCUMENTS

EP    1176750    1/2002

* cited by examiner

*Primary Examiner*—Mohammad H Ghayour
*Assistant Examiner*—Leila Malek
(74) *Attorney, Agent, or Firm*—Steven A. Shaw; W. James Brady; Frederick J. Telecky, Jr.

(57) ABSTRACT

A communication system disclosed herein includes a channel quality estimation module that determines the channel quality metric utilizing the preamble portion of the packet only. Data, in such a communication system, is transmitted in the form of a packet over a data channel during a packet transmission, wherein each data channel includes several subchannels. The system includes a receiver having at least a baseband processor. The baseband processor couples to receive each baseband sample signal. Specifically, the baseband processor calculates the gain estimation of the each subchannel and generates a channel quality metric for each subchannel that is derived by deinterleaving the sequence of gain estimation magnitudes, convolving the deinterleaved sequence of gain estimation magnitudes with a short window index, and detecting the number of times the convolution falls beneath a predetermined threshold.

9 Claims, 4 Drawing Sheets

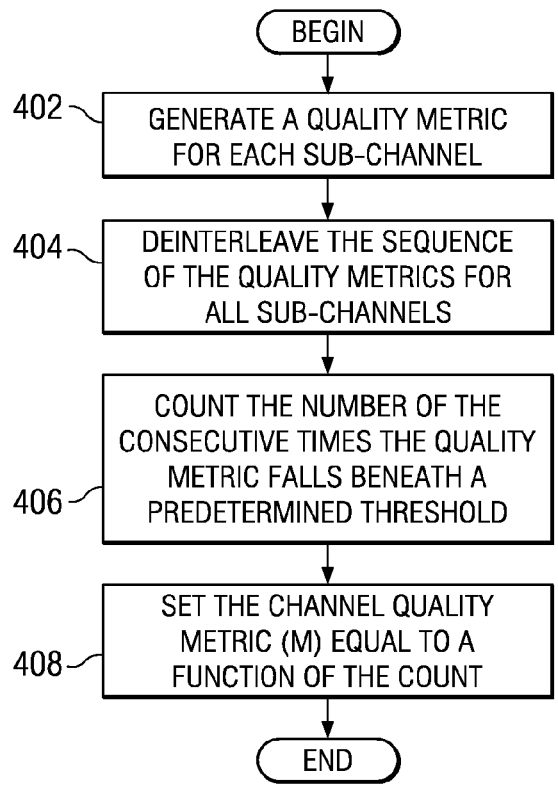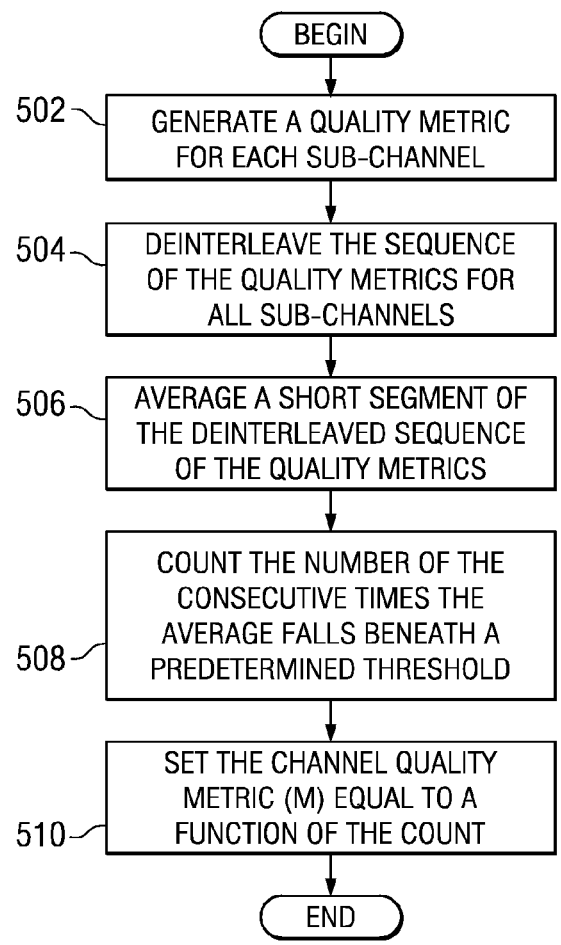

METHOD AND APPARATUS FOR CHANNEL QUALITY METRIC GENERATION WITHIN A PACKET-BASED MULTICARRIER MODULATION COMMUNICATION SYSTEM

CROSS REFERENCE TO RELATED APPLICATIONS

This application claims priority under 35 USC 119(e)(1) of Provisional Application No. 60/429,691 filed Nov. 26, 2002.

This application is related to "Method and Apparatus for Channel Quality Metric Generation Within A Packet Based Multicarrier Modulation Communication System", Provisional Application No. 60/429,771 filed Nov. 27, 2002.

FIELD OF THE INVENTION

The present invention relates to communication systems for general information transmission, and, more particularly, to a packet-based communication system whose physical layer is based on multicarrier modulation.

BACKGROUND OF THE INVENTION

The world-wide growth of frequency spectrum efficient communications systems and the enhancement of their performance has increased the number of individual users and data transmission rates for these systems. Packet-based communication systems whose physical layers are based on multicarrier modulation are commonly referred to as OFDM (Orthogonal Frequency Division Multiplexing) or DMT (Discrete MultiTone) systems. The available transmission channel bandwidth within an OFDM system is subdivided into a number of discrete channels or carriers. These channels overlap and are orthogonal to each other. Data is transmitted in the form of symbols that have a predetermined duration and encompass some number of carrier frequencies. Systems in compliance with IEEE 802.11a and 802.11g wireless LAN standards are well-known examples of such systems.

The conventional structure of packets in a packet-based data transmission system comprises a preamble, a header, and a data payload. The preamble is typically used to estimate the channel impulse response, derive settings for the automatic gain control circuits, and perform carrier frequency offset estimation. It is also used for synchronization and other physical layer functions. The header is typically used for conveying information about variable physical layer parameters such as the size of the data payload and the type of modulation being employed for a particular packet.

Transmission properties, in general, and the impulse response, in particular, of wireless communication channels are time-varying statistical quantities. These variations in channel conditions are caused by several factors which include but are not limited to relative movement between the transmitter and receiver and movement of objects such as automobiles, people, portable office furniture, etc. in the vicinity of either the transmitter, receiver, or both. An example may include the use of a subscriber terminal within a wireless communication system in an automobile. The quality of the connection is extremely high since the subscriber terminal has a direct visual connection to the antenna of a base station within the system. Next, a truck moves in front of the automobile, blocking the direct visual connection to the antenna. Consequently, the quality of the wireless connection degrades, which is detected by the base station system in connection with channel estimation. Therefore, even when the transmit and receive antennas are both fixed spatially, the channel between them can still vary with time.

In such a wireless data transmission system, these variations in the channel response result in a corresponding variation in the short-term data rate that can be supported by the channel. Thus, the design of most data communication systems enable communication on the wireless channel at different data rates. When the signal-to-noise ratio (SNR) is high for a particular channel, the channel quality is deemed to be good. Thereby, higher data rates are used on this specific channel. When the SNR is low, however, channel conditions are poor and, as a result, lower data rates are selected for the specific channel. "Noise" as defined here with respect to the SNR is understood to include receiver thermal noise as well as radio frequency interference (RFI) in the passband of the communication system. These varying data rates for each channel are selected either manually by the user or automatically by the system. In either case, some method and apparatus for estimating channel quality is required.

Channel quality metrics are used to estimate channel quality and thereby vary data rates. Most channel quality metrics are related to or derived from the SNR measured at the receiver in an effort to set the data transmission rates of each channel. A conventional approach uses the average SNR for each channel to calculate the channel quality metric. As a result, either a large number of short packets or a small amount of long packets must be obtained to provide a reliable average SNR. Thus, in many wireless data communication systems, accurate measurement of the received SNR is difficult to achieve over a short period of time.

Moreover, to add to the complexity of the derivation of the SNR, within OFDM-based systems, there are multiple SNRs that correspond to multiple sub-channels within a channel. There are numerous approaches towards the combination or averaging of all the SNRs corresponding to each sub-channel to arrive at one quality metric for a particular channel. Some approaches use either the minimum value or the maximum value of each SNR in lieu of the arithmetic average of all SNRs within a given channel.

In an ideal situation, the channel impulse response remains constant for at least two packet-transmission durations. In this case, the channel is understood to have a coherence time that exceeds the duration of two packets. Accordingly, a receiving station may be able to estimate the channel quality from a received packet and select an appropriate transmission rate for its next transmission back to the station that sent the packet. This scenario, however, relies upon symmetry in the channel conditions between the transmitter and the receiver.

A known approach for derivation of the SNR uses other metrics, such as the packet error rate (PER), where the SNR is assumed to be proportional to the PER. Typically, the operating PER in modern wireless data communication systems is 1%. Thus, a large amount of packets are necessary to measure the operating PER with accuracy. As such, this method of deriving the SNR is time consuming as well.

Other approaches use the Viterbi decoder path metric to estimate the average SNR in IEEE 802.11-type OFDM physical layers. This estimation, however, requires an extensive amount of time to obtain reliable values of the SNR for each channel. Accordingly, the adaptation of data rates with respect to these SNR estimations is slow.

Thus, in order to increase the long-term average data transmission rates on communication systems whose channel impulse response is time-variant, it is necessary to be able to adapt data transmission rates more quickly with respect to changing channel conditions. This requires metrics for which reliable estimates can be obtained quickly. Since most modern packet-based wireless data communication systems support packets of varying length, it is desirable for the fidelity of the computed metrics to be largely independent of packet length. In the alternative, it is desirable for the fidelity to be guaranteed for the smallest expected packet.

The present invention is directed to overcoming, or at least reducing the effects of one or more of the problems set forth above.

SUMMARY OF THE INVENTION

To address the above-discussed deficiencies of channel quality estimation, the present invention teaches a communication system having a channel quality estimation module that determines the channel quality metric utilizing the preamble portion of the packet only. Data, in such a communication system, is transmitted in the form of a packet over a data channel during a packet transmission, wherein each data channel includes several sub-channels. A receiver in such communication system demodulates the data signal it receives for further processing. The receiver includes at least a baseband processor. In operation, the baseband processor couples to process each baseband sample signal. The baseband processor calculates the gain estimation $h_i$ of each of the sub-channels and generates a channel quality metric M that is derived by deinterleaving the sequence of gain estimation magnitudes ($|h_i|$), convolving the deinterleaved sequence of gain estimation magnitudes ($|h_i|$) with a short window index, and detecting the number of times the convolution falls beneath a predetermined threshold. Channel quality metric M gives an indication of the BER for the current packet.

In another embodiment, the baseband processor generates a channel quality metric M which is derived by deinterleaving the sequence of gain estimation magnitudes ($|h_i|$), averaging a short predetermined segment of the deinterleaved sequence of gain estimation magnitudes ($|h_i|$), and detecting the number of times the average falls beneath a predetermined threshold.

In another embodiment, the baseband processor generates a channel quality metric M is derived by deinterleaving the sequence of gain estimation magnitudes ($|h_i|$), averaging a short predetermined segment of the deinterleaved sequence of gain estimation magnitudes ($|h_i|$), and detecting the number of times the average falls beneath a predetermined threshold.

In yet another embodiment, the baseband processor generates a channel quality metric M that is derived from the detection of a sequence of gain estimation magnitudes ($|h_i|$) of low amplitude adjacent to gain estimation magnitudes ($|h_i|$) of moderate amplitude during a predetermined interval.

Advantages of this design include but are not limited to a communication system that transmits data in the form of a packet over a data channel that includes a channel quality estimation module for calculating a channel quality metric using only the preamble portion of the packet. Since it is computed using information in the packet preamble, the computation is independent of the data payload. This results in a consistent variance in the computed metric and also guarantees the quality of the metric even for very short packets. Furthermore, the communication system having such a channel quality metric module provides a timely estimate of channel quality on time-varying channels, making its application an ideal choice for wireless communications. Thus, the reliability of making a channel assessment increases. Additionally, the channel quality metric is simple to compute and, therefore, does not significantly increase the complexity of the receiver design.

These and other features and advantages of the present invention will be understood upon consideration of the following detailed description of the invention and the accompanying drawings.

BRIEF DESCRIPTION OF THE INVENTION

For a more complete understanding of the present invention and the advantages thereof, reference is now made to the following description taken in conjunction with the accompanying drawings in which like reference numbers indicate like features and wherein:

FIG. 1 illustrative of a communication system in accordance with an embodiment of the invention;

FIG. 2 displays the channel estimation module of the communication system of FIG. 1;

FIG. 4 is a flow chart showing a method in accordance with another embodiment of the invention;

FIG. 5 is a flow chart showing a method in accordance with yet another embodiment of the invention.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
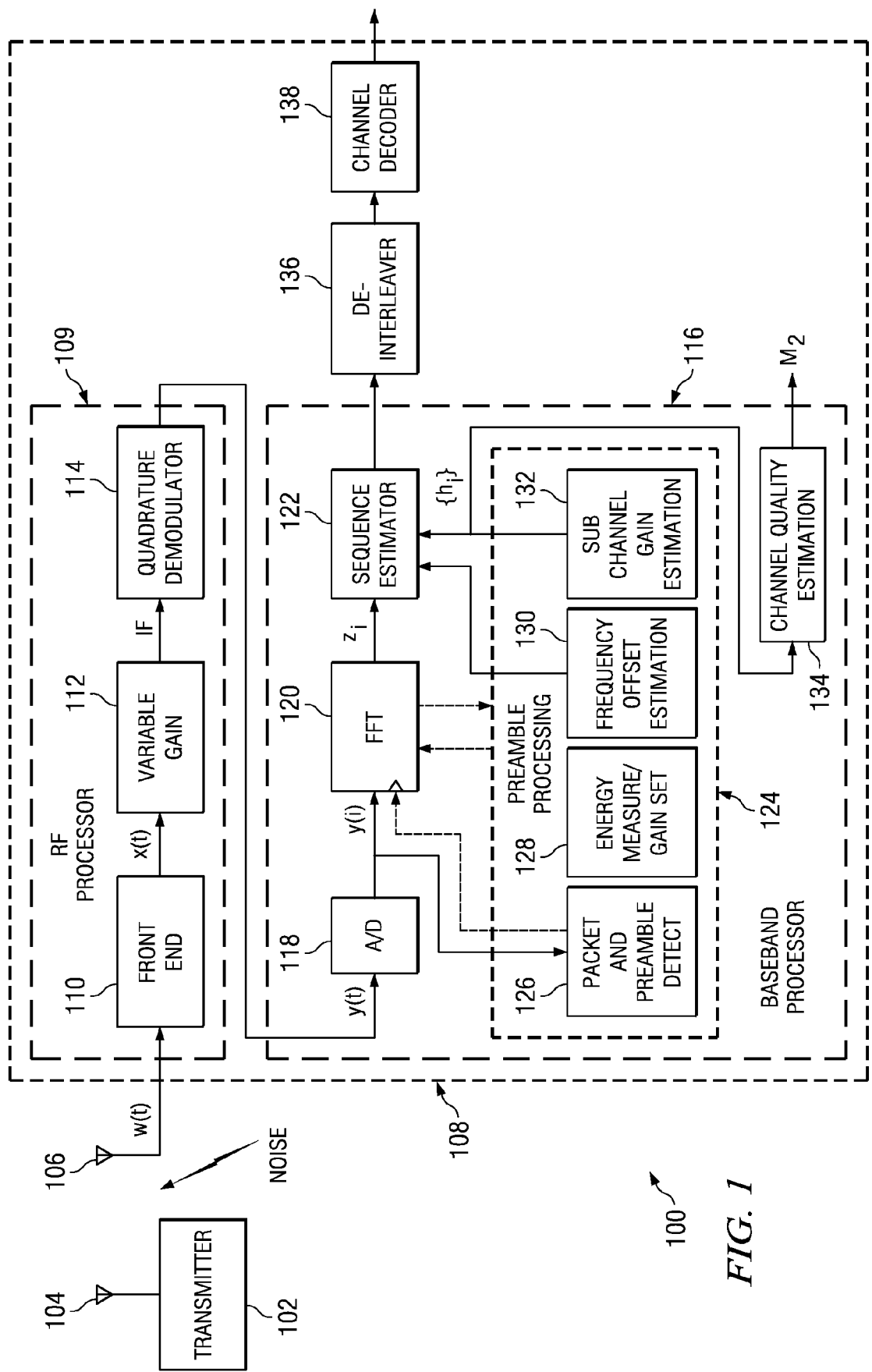

FIG. 1 depicts a high level block diagram of a radio communications system 100 In which the teachings of the present invention can be utilized. As shown, the radio system 100 includes a radio transmitter 102 having a transmit antenna 104 and a radio receiver 108. The radio receiver 108 includes a receive antenna 106, a radio frequency (RF) processor 109, and a baseband processor 116. Each of these modules may be constructed in accordance with conventional circuit design practices. Those skilled in the art should recognize that a receiver having a channel quality metric module in accordance with the present invention should not be limited to the inclusion of an antenna and a radio frequency processor. Specifically, a receiver including the teachings of the present invention may include solely a baseband processor 116.

Particularly, radio transmitter 102 connects to the transmit antenna 104 to transmit an information signal to receiver 108. Receive antenna 106 connects to front end unit 110 to provide a processed antenna signal x(t). As shown, RE processor 109 includes a front end unit 110, a variable gain unit 112, and a demodulator 114, where the variable gain unit 112 couples between front end unit 110 and demodulator 114. Furthermore, baseband processor 116 includes an analog-to-digital converter (ADC) 118, a Fast Fourier Transform (FFT) unit 120, a deinterleaver 121, a sequence estimator 122, a preamble processing unit 124, and a channel quality estimation module 134. More particularly, ADC 118 connects to FFT unit 120, preamble processing unit 124 and channel quality estimation module 134. FFT unit 120 connects to sequence estimation 122 to supply FET sequence $Z_i$ of the digital sample signal $y_i$. In general, FFT unit 120 extracts and demodulates sub-channel symbols from each preamble to be provided to any one of modules 122, 128, 130 and 132. Preamble processing unit 124 connects to FFT unit 120 to provide control signaling. More particularly, preamble processing unit 124 includes a packet and preamble detect module 126, an energy measure gain set module 128, a frequency offset estimation module 130 and a sub-channel gain estimation module 132. Specifically, packet and preamble detect module 126 connects to control FET unit 120 by signaling when the beginning of a packet is detected and when the end of a preamble is detected. Energy measure/gain set module 128 provides an energy measurement of the signal y(t). Sequence estimator 122 connects to receive the frequency offset from the frequency offset estimation module 130. Additionally, sub-channel gain estimation module 132 connects to sequence estimator 122 and channel quality estimation module 134 to provide gain estimation $h_i$.

In operation, transmitter 102 transmits an information signal (modulated at a carrier frequency $f_1$) from the transmit antenna 104. The transmitted signal reaches the radio receiver after passing through a propagation medium (e.g., a mobile radio channel). Data is transmitted in the form of packets sent over a data channel during a packet transmission. Each data channel includes a plurality of sub-channels. The packet comprises three distinct portions: a preamble, a header and a data payload portion. Each transmitted signal, as well as noise, are received at the receiver antenna 106 as the received modulated RF signal w(t). The received signal is processed by the RF processor 109 to produce a plurality of partially demodulated baseband signals y(t).

Specifically, the RF processor 109 amplifies, mixes, filters, samples, and quantizes the signal to extract a partially demodulated baseband signal y(t) corresponding to the carrier frequency $f_1$. Receiver front end unit 110 filters and amplifies the RF signal and converts it to an intermediate frequency (IF) signal x(t). Variable gain unit 112 amplifies the signal x(t) to provide a signal of constant energy to baseband processor 116. Demodulator 114 partially demodulates the signal to provide a partially demodulated baseband signal y(t) to the baseband processor 116 for further demodulation of the received modulated RF signal w(t). While a specific radio frequency processor architecture is provided for purposes of illustration, those skilled in the art will appreciate that other known architectures can be used (e.g., wideband digitization followed by digital channelization).

Through the processing of the preamble, header, and data payload portions of the packet sent, baseband processor 116 measures the energy/power of the signal received, calculates the gain estimation, and calculates the channel quality metric, among various other functions. Specifically, partially demodulated baseband signal y(t) is converted from analog-to-digital by ADC 118. Therein, the partially demodulated baseband signal y(t) is sampled and quantized to yield the discrete-time signal $y_i$. Upon system initiation, preamble processor 124 couples to receive the discrete-time signal $y_i$ such that each module 126-132 within processor 124 processes the discrete-time signal $y_i$. In a packet-based transmission, it is often necessary to know the beginning of the packet in order to establish proper timing since different portions of the packet are referenced from the beginning of the packet. The preamble is often used for this purpose-it usually contains a specific pattern of modulated symbols of which the receiver 108 is aware. Thus, packet and preamble detect module 126 continually looks for this pattern and when it is found the beginning of a packet is declared. Timing information is then established for the rest of the packet duration.

Upon the detection of the beginning of a packet, preamble processor 124 sends a control signal to FFT unit 120 as a form of notice that a preamble has been received. As stated previously, FFT unit 120 extracts and demodulates sub-channel symbols from the preamble, wherein such information may be provided to one or all of modules 122, 128, 130 and 132 for further processing. In this manner, after a packet has been detected, the preamble is first processed to obtain all the information that is required to process the remainder of the packet (the header and the payload). After system initiation, when the end of the preamble is detected by the preamble processor 124, preamble processor 124 sends another control signal to FET unit 120 to process the header and data payload portions of the signal $y_i$. Accordingly, FET unit 120 converts discrete-time signal $y_i$ into a corresponding FET sequence $Z_i$. Deinterleaver 121 and sequence estimator 122 processes sequence $Z_i$ for further processing known to those skilled in the art. In addition, sequence estimator 122 utilizes some processed variables for preamble processor 124 which also shall be described in detail.

Specifically, within the preamble processor 124, the energy measure and gain set module 128 measures the power of the discrete-time signal $y_i$. Frequency offset estimation module 130 estimates the frequency offset of discrete-time signal $y_i$ and relays this information to sequence estimator 122. Sub-channel gain estimation module 132 estimates the gain estimation $h_i$ for each sub-channel and relays the gain estimation $h_i$ to both the sequence estimator 122 and channel quality estimation module 134 to ensure that, in the subsequent processing of the sequence $y_i$, specific impairments of the wireless channel are compensated for and to calculate a channel quality metric M, respectively. The preamble often contains specific symbol patterns that facilitate the estimation of these specific channel impairments. The Viterbi algorithm is used to implement sequence estimator 122 which requires information that is provided by the preamble processing unit 124 as it extracts the binary information from discrete FFT sequence $Z_i$.

Figure 2:
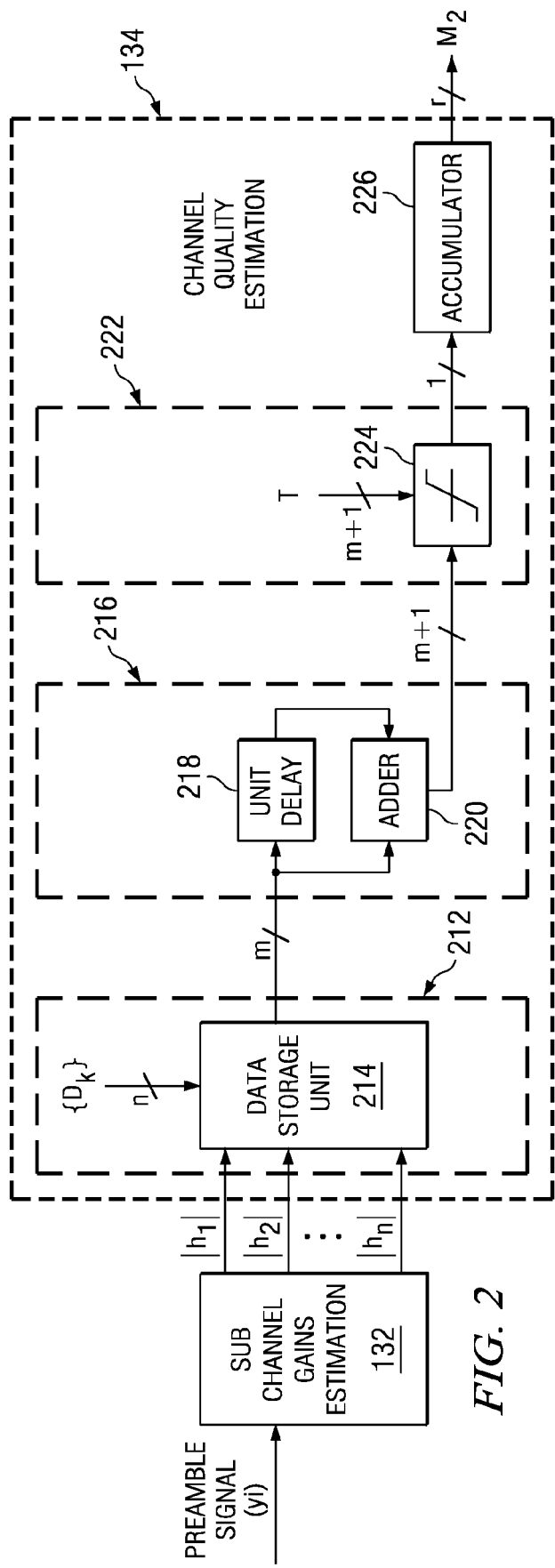

Moreover, as shown in FIG. 2, channel quality estimation module 134 couples to receive gain estimation magnitudes $\{|h_1|, |h_2|, \ldots |h_N|\}$ to perform its calculation of channel quality metric M. Channel quality estimation module 134 includes descrambler 212, finite impulse response (FIR) filter 216, comparator 222 and accumulator 226. Descrambler 212 comprises a deinterleaved sequence $D_k$ fed into a data storage unit 214. As stipulated, data storage unit 214 couples to receive all of the gain estimation magnitudes $\{|h_1|, |h_2|, \ldots |h_N|\}$ in parallel. The output of descrambler 212, however, is read out of data storage unit 214 in the predetermined order given by deinterleaved sequence $D_k$. FIR filter 216 may be a low pass filter as shown including unit delay 218 and adder 220. In operation, each gain estimation value in the deinterleaved sequential order is received by unit delay 218 and adder 220. Adder 220 sums the deinterleaved sequence with the delayed deinterleaved sequence to generate a sum. Comparator 222 compares a predetermined threshold variable T with the magnitude of each sum. If the sum is less than the predetermined threshold variable T, comparator 222 generates a logic one which is fed to accumulator 226. Each logic one is effectively counted by accumulator 226 to provide the channel quality metric M.

In operation, channel quality metric M is computed by processing the sub-channel gain estimation magnitudes $\{|h_1|, |h_2|, \ldots |h_N|\}$ in three steps. It is intended to characterize the channel quality by enumerating the incidence of runs of low sub-channel gain estimations magnitudes $\{|h_1|, |h_2|, \ldots |h_N|\}$ when these gains are viewed in a particular order. This is of concern in packet-based multicarrier systems that employ a Viterbi decoder and interleaver for the convolutional code.

The premise here is that, when the sub-channel gain estimations magnitudes $\{|h_1|, |h_2|, \ldots |h_N|\}$ are viewed in the order in which they are used by the Viterbi decoder, a channel which results in a large number of runs of low gain magnitudes is more likely to cause packet errors than one with fewer such runs. Thereby, in an effort to capture the effect of a gain estimation value $h_i$ of low magnitude adjacent in decoder sequence to a gain estimation value $h_i$ of moderate amplitude, the effect of which may cause data errors, averaging using a short window is implemented using FIR filter 216.

The sub-channel gain estimations $\{|h_1|, |h_2| \ldots |h_N|\}$ are first computed from the preamble signal as previously described. Descrambler 212 descrambles these N numbers which represents the number Of sub-channels having data. Particularly, for systems in compliance with the IEEE 802.11a standard, N equals 48. To implement descrambler 212, the N sub-channel gain estimations $\{|h_1|, |h_2| \ldots |h_N|\}$ are loaded into memory 214 in parallel. In contrast, these N sub-channel gain estimations $\{|h_1|, |h_2| \ldots |h_N|\}$ are read out serially in the order designated by the deinterleave sequence $\{D_k\}$. The output of descrambler 212 is fed into the FIR filter 216, wherein FIR filter 216 is a low-pass filter representing convolution by [1 1]. Comparator 222 outputs a logic one if the sum is less than threshold T and a logic zero otherwise. Accumulator 226 sums each sequence to yield a channel quality metric M.

Figure 3:
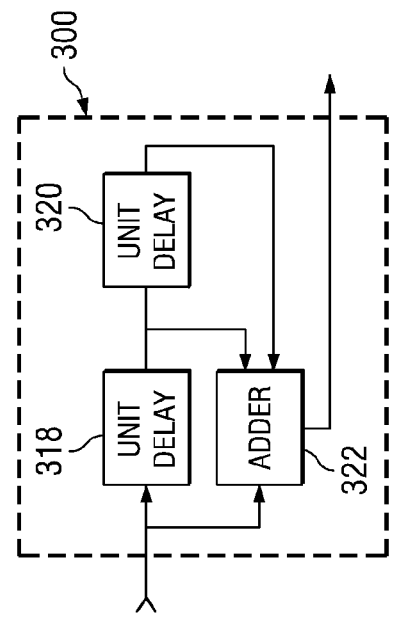
FIG. 3 shows an alternate FIR filter for the channel estimation module of FIG. 2.
Figure 6:
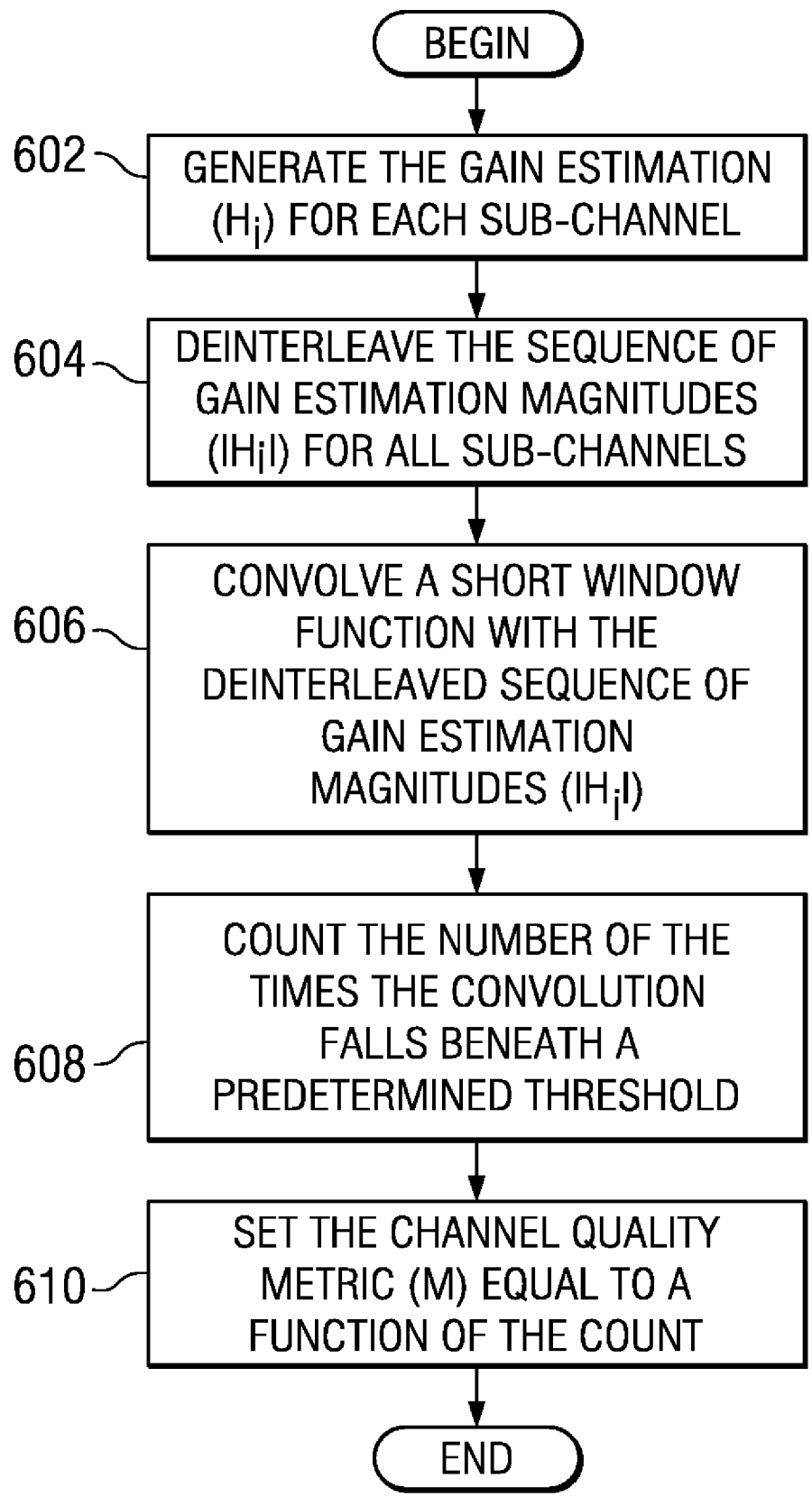
FIG. 6 is a flow chart showing a method in accordance with a further embodiment of the invention.

The method of generating a channel quality metric according to the present invention includes a first step of deinterleaving the sequence of gain estimation $\{|h_1|, |h_2|, \ldots |h_N|\}$ to provide a deinterleaved sequence $\{d_j\}$. In a system compliant with IEEE standard 802.11a, a binary phase shift keyed (BPSK) deinterleaver having a block size of 48 may be used on the 48 sub-channel gain estimation magnitudes $\{|h_1|, |h_2|, \ldots |h_N|\}$ In another step, the convolution of the sub-channel gain estimate magnitudes $\{|h_1|, |h_2|, \ldots |h_N|\}$ with a short window function implemented by FIR filter 216 is derived to obtain the sequence $\{z_i\}$. The window function may have arbitrary magnitude and may be of arbitrary length, but an effective window function should be relatively short and comprised of samples of approximately equal magnitude. Specifically, an alternative embodiment, may include a length-two averaging window of [0.5 0.5]. Yet another embodiment of FIR filter 300 may include, as shown in FIG. 3, a length-three window [α α α] where α is a real number. More particularly, FIR filter 300 may include a first unit delay 318, a second unit delay 320 and an adder 322. In operation, each gain estimation value in the deinterleaved sequential order is received by unit delay 318 and adder 322. Second unit delay 320 couples to receive the first delayed deinterleaved sequence to generate a second delayed deinterleaved sequence. Adder 322 sums the values of the deinterleaved sequence with the first and second delayed deinterleaved sequence to generate a sequence of values.

In a third step, accumulator 226 counts the number of times the convolution $\{z_i\}$ result falls beneath predetermined threshold T. If it were necessary to use a different deinterleaver size from packet to packet, channel quality metric M may be normalized using the size of descrambler 212.

It should be noted that the computation of channel quality metric M may be implemented with operations distinctly different from the three explicit steps described above. It is also possible to compute a metric equivalent to channel quality metric M by operating instead on functions of $\{h_i\}$. For example, an equivalent metric could be computed beginning using the squared magnitude of the gain estimations $\{|h_i|^2\}$ or the logarithm of the gain estimations $\{\log(h_i)\}$.

Though the invention has been illustrated with respect to an OFDM system, those skilled in the art will appreciate that the invention is applicable to any multicarrier system that includes an error correcting code. Furthermore, the present invention can be implemented in systems including multi-carrier code division multiple access (MC-CDMA), orthogonal frequency division multiple access (OFDMA), asymmetric digital subscriber line (ADSL), digital audio broadcast (DAB) and other similar systems.

The channel quality metric for packet-based multicarrier physical layers have been described with reference to systems compliant with IEEE standards 802.11a and 802.11g. Those skilled in the art would recognize that the computation of the channel quality metric in the first and second embodiment should not be limited to such systems having packet-based multicarrier physical layers in systems compliant with IEEE standards 802.11a and 802.11g. The computation and implementation of channel quality metric processing may be implemented in other multicarrier systems. Furthermore, the novel implementation of the channel quality metric implementation is applicable to both wired and wireless communication systems.

Those of skill in the art will recognize that the physical location of the elements illustrated in FIGS. 1, 2, and 3 can be moved or relocated while retaining the function described above.

Advantages of this design include but are not limited to a communication system that transmits data in the form of a packet over a data channel that includes a channel quality estimation module for calculating a channel quality metric computed from information available within the physical layer preamble. Thus, its computation is independent of packet length. This results in a consistent variance in the computed metric and also guarantees the quality of the metric even for very short packets. Thus, the reliability of making a channel assessment increases. Therefore, the implementation of the channel quality metric provides a reliable assessment of the instantaneous channel quality based upon the reception of a single packet. Moreover, the channel quality metric is simple to compute and, therefore, does not significantly increase the complexity of the receiver design. In addition, early channel quality metric generation enables a communication system to power down the receiver 108 for the remainder of the current packet to conserve power if it is determined, from the estimate, that the likelihood of the packet payload being correctly decoded by the sequence estimator is very low.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A receiver for demodulating data transmitted in the form of a packet sent over a data channel during a packet transmission in a multi-carrier modulation communication system, each data channel having a plurality of subchannels, each packet including a preamble, a header and a data payload, the receiver comprising:
a baseband processor coupled to receive the data transmitted for processing the plurality of baseband sample signals to calculate a gain estimation ($h_i$) of each subchannel, wherein the baseband processor generates a channel quality estimation metric (M) derived by deinterleaving a sequence of gain estimation magnitudes ($|h_i|$), convolving the deinterleaved sequence of gain estimation magnitudes ($|h_i|$) with a window function comprised of samples of approximately equal magnitude, and detecting the number of times the convolution falls beneath a predetermined threshold;
a deinterleaver coupled to the baseband processor to deinterleave the processed plurality of baseband sample signals to provide a deinterleaved signal sequence; and
a channel decoder coupled to receive the deinterleaved signal sequence to decode the sequence.

2. A receiver for demodulating data transmitted in the form of a packet sent over a data channel during a packet transmission in a multi-carrier modulation communication system, each data channel having a plurality of subchannels, each packet including a preamble, a header and a data payload, the receiver comprising:
at least one antenna element for receiving a radio frequency (RF) signal and providing a corresponding antenna signal;
a RF processor coupled to the at least one antenna element for processing the antenna signal to provide a plurality of baseband sample signals, each baseband sample signal corresponding to one of the plurality of subchannels each having a carrier frequency; and
a baseband processor coupled to the RF processor for processing the plurality of baseband sample signals to calculate a gain estimation ($h_i$) of each subchannel, wherein the baseband processor generates a channel quality estimation metric (M) derived by deinterleaving the sequence of gain estimation magnitudes ($|h_i|$), convolving the deinterleaved sequence of gain estimation magnitudes ($|h_i|$) with a window function comprised of samples of approximately equal magnitude, and detecting the number of times the convolution falls beneath a predetermined threshold;
a deinterleaver coupled to the baseband processor to deinterleave the processed plurality of baseband sample signals to provide a deinterleaved signal sequence; and
a channel decoder coupled to receive the deinterleaved signal sequence to decode the sequence.

3. A receiver as recited in claim 2, wherein the packet is an OFDM symbol block.

4. A receiver as recited in claim 2, wherein the RF processor comprises:
a front end module coupled to receive the antenna signal to process the antenna signal;
a variable gain module coupled to receive the antenna signal; and
a demodulator coupled to receive the antenna signal to partially a demodulate the antenna signal into a plurality of baseband sample signals.

5. The receiver as recited in claim 2, wherein the baseband processor comprises:
an analog-to-digital converter to convert the baseband sample signal into a digital baseband sample signal wherein the preamble includes the plurality of subchannel symbols;
a Fast Fourier transform (FFT) unit coupled to receive the digital baseband sample signal extract and demodulate the plurality of subchannel symbols from the preamble and to produce a discrete FFT sequence of the header and the data payload after the preamble has been processed;
a deinterleaver coupled to receive the discrete FFT sequence of the header and the data payload;
a sequence estimator coupled to the deinterleaver to receive the deinterleaved discrete FFT sequence of the header and the data payload for error correction when a convolutional encoder is used to transmit the RF signal;
a preamble processing module coupled to the analog-to-digital converter to receive the digital baseband sample signal, the preamble processing module comprises:
a packet and preamble detection module coupled to receive the digital baseband sample signal to detect the beginning of a packet and end of a preamble;
an energy measure and gain set module coupled to receive the digital baseband sample signal to measure the power of the digital baseband sample signal;
a frequency offset estimation module coupled to receive the digital baseband sample signal to estimate the frequency offset; and
a subchannel gain estimation module coupled to receive the digital baseband sample signal to estimate the gain estimation ($h_i$) for each subchannel,
wherein the sequence estimator coupled to the preamble processing module to receive the frequency offset and the gain estimation for error correction of the discrete FFT sequence of the header and the data payload,
wherein the preamble processing module coupled to the FFT unit send control signals when the beginning of the packet is detected for processing of the preamble and when the end of the preamble is detected for processing of the header and the data payload; and
a channel quality estimation module coupled to the subchannel gain estimation module to receive the gain estimation ($h_i$) for each subchannel and produce the channel quality estimation metric (M).

6. The receiver as recited in claim 2, wherein the channel quality estimation module comprises:
a data storage unit having coupled to receive the gain estimation magnitudes ($|h_i|$) and a deinterleave sequence ($D_k$), wherein the gain estimation magnitudes ($|h_i|$) are read out of the data storage unit in the order designated by the deinterleave sequence ($D_k$);
a finite impulse response filter coupled to receive the deinterleaved sequence of gain estimation magnitudes ($|h_i|$) ordered to convolve the deinterleaved sequence of gain estimation magnitudes ($|h_i|$) with a predetermined window function comprised of samples of approximately equal magnitude to provide a convolved result;
a comparator, having a predetermined threshold value, coupled to the finite impulse response filter to compare the convolved result with the predetermined threshold value and provide a predetermined logic value when the convolved resulted is less than the predetermined threshold value; and
an accumulator coupled to the comparator to add each logic value together as a total count, wherein the total count is the channel quality metric (M).

7. The receiver as recited in claim 6, wherein the data storage unit is a read-only memory (ROM).

8. The receiver as recited in claim 6, wherein the finite impulse response filter is a low pass filter, comprising:
- a unit delay coupled to receive the deinterleaved sequence of gain estimation magnitudes ($|h_i|$) to provide a delayed sequence;
- an adder coupled to receive the deinterleaved sequence of gain estimation magnitudes ($|h_i|$) and the delayed sequence to provide a sum to the comparator.

9. The receiver as recited in claim 6, wherein the finite impulse response filter is a low pass filter, comprising:
- a first unit delay coupled to receive the deinterleaved sequence of gain estimation magnitudes ($|h_i|$) to provide a first delayed sequence;
- a second unit delay coupled to receive the first delayed sequence to provide a second delayed sequence;
- an adder coupled to receive the deinterleaved sequence of gain estimation magnitudes ($|h_i|$), the first delayed sequence, and the second delayed sequence to provide a sum to the comparator.

* * * * *